United States Patent [19]

Ito et al.

[11] Patent Number: 5,126,891

[45] Date of Patent: Jun. 30, 1992

[54] MAGNETIC RECORDING APPARATUS

[75] Inventors: Takeyoshi Ito; Masafumi Hirata, both of Tokyo, Japan

[73] Assignee: Fuji Photo Film Co., Ltd., Minami-Ashigara, Japan

[21] Appl. No.: 370,889

[22] Filed: Jun. 23, 1989

[30] Foreign Application Priority Data

Jun. 23, 1988 [JP] Japan .................. 63-153618

[51] Int. Cl.⁵ .......................................... G11B 15/12
[52] U.S. Cl. ............................. 360/61; 360/62; 360/63
[58] Field of Search ................ 360/61, 62, 63, 46, 360/65, 67, 68; 358/334, 310

[56] References Cited

U.S. PATENT DOCUMENTS

| 3,076,969 | 2/1963 | Fogarty | 360/46 |
| 4,467,368 | 8/1984 | Horstmann | 358/334 |
| 4,987,501 | 1/1991 | Hori | 360/66 |

Primary Examiner—Aristotelis Psitos
Assistant Examiner—Varsha V. Sheladia

[57] ABSTRACT

A magnetic recording apparatus includes a control circuit and a switch which is provided between a recording amplifier and a secondary coil of a transformer for coupling the recording amplifier with a magnetic head, the control circuit stops a flow of a transient current into the magnetic head by controlling an ON/OFF timing of the switch.

2 Claims, 6 Drawing Sheets

MAGNETIC RECORDING APPARATUS

BACKGROUND OF THE INVENTION

1. Field of the Invention

This invention relates to a magnetic recording apparatus wherein a recording amplifier is coupled to a magnetic head by a transformer. The invention is directed to an improvement for recording all information without any omission of information on a circular track of a magnetic disk.

2. Description of the Prior Art

Referring to FIG. 5 (circuit configuration) and FIG. 6 (operation), a prior art in an electronic still camera system is explained.

In FIGS. 5 and 6, an output terminal of a recording amplifier 1 is connected to a source voltage Vcc through a primary coil of a step-up transformer 2. A magnetic head 3 is connected to a secondary coil. A frequency modulated (FM) luminance signal Y-FM and a frequency modulated chrominance signal C-FM are input to recording amplifier 1 through a mixer 4. An input terminal of a play-back amplifier 5 is AC coupled to the primary coil by a condenser 6.

A magnetic head 3 is used for recording and reproduction. The recording amplifier 1 and the play-back amplifier 5 are controlled by a control circuit 7. A recording switch 8 and a rotation phase detector 9 for a video floppy disk are connected to the control circuit 7. The phase detector 9 outputs a PG signal, i.e. one pulse per one rotation of the video floppy disk.

When the switch 8 is turned on, the circuit 7 generates a trigger pulse 11 (FIG. 6) which overlaps one pulse 10-1 of a PG pulse sequence 10. In a term (one vertical scanning period: 1V) between the pulse 10-1 and a pulse 10-2 just after the pulse 10-1, a control pulse 12 out of the circuit 7 goes to a high level, and an output of the recording amplifier 1 turns on. Accordingly a recording current $I_1$ with a bias DC current flows into the primary coil of the transformer 2. As a result, a recording current $I_2$ flows into the magnetic head 3, and a still video signal is recorded on a circular track of the video floppy disk.

However, because of a transformer coupling between the recording amplifier 1 and the magnetic head 3, when the amplifier 1 is turned off, after the recording current $I_2$, a transient current 14 flows into the magnetic head 3 which is the result of a back electromotive force.

Since the transient current 14 operates as an erasing current, a top part of an already recorded information is erased by the current 14 and the information is missed.

SUMMARY OF THE INVENTION

An object of the present invention is to provide a magnetic recording apparatus in which a transient current does not flow into the magnetic head when the recording amplifier is turned off.

The magnetic recording apparatus of the present invention includes a recording amplifier, a magnetic head for recording information on a circular track of a magnetic disk there is a transformer for coupling the recording amplifier with the magnetic head. Switch means is provided between the magnetic head and a secondary coil of the transformer. There is also control means for making the switch means turn on during a term equal to or over a recording time of one track. The control means is also for making an output of a recording current from the recording amplifier to the primary coil of the transformer turn on at a same time or before a turning on of the switch means and for making the output of the recording current turn off at a same time or after a turning off of the switch means.

DETAILED DESCRIPTION OF THE PREFERRED EMBODIMENTS

When a recording current from a recording amplifier to a primary coil turns off, or before the turning off of the recording current to the primary coil from the recording amplifier, a connection between a secondary coil and a magnetic head is opened. Therefore, because a transient current does not flow into the head, already recorded information is not erased.

Since a connection between the secondary coil and the head is kept during a time of one track recording time or over, at a beginning of or before the connection, a recording current flows from the amplifier to the primary coil. Therefore all of information can be recorded on the track.

Referring to FIGS. 1-4, embodiments are described.

Figure 1:
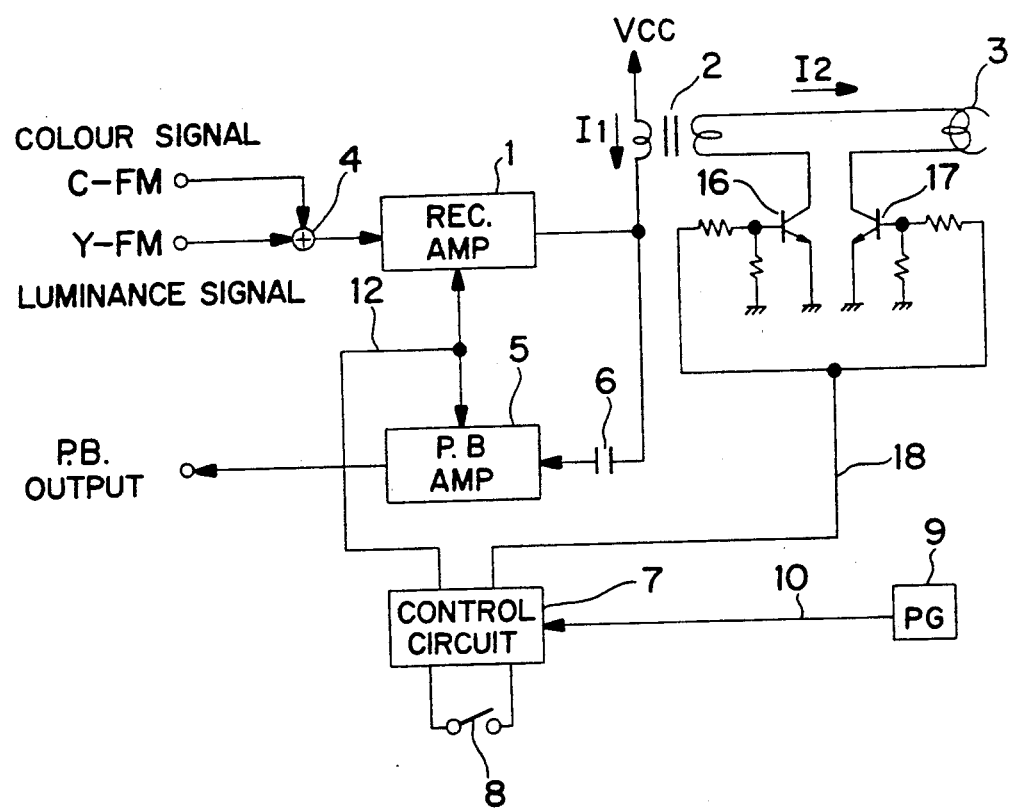
FIG. 1 shows a circuit configuration of an embodiment of the present invention.
Figure 2:
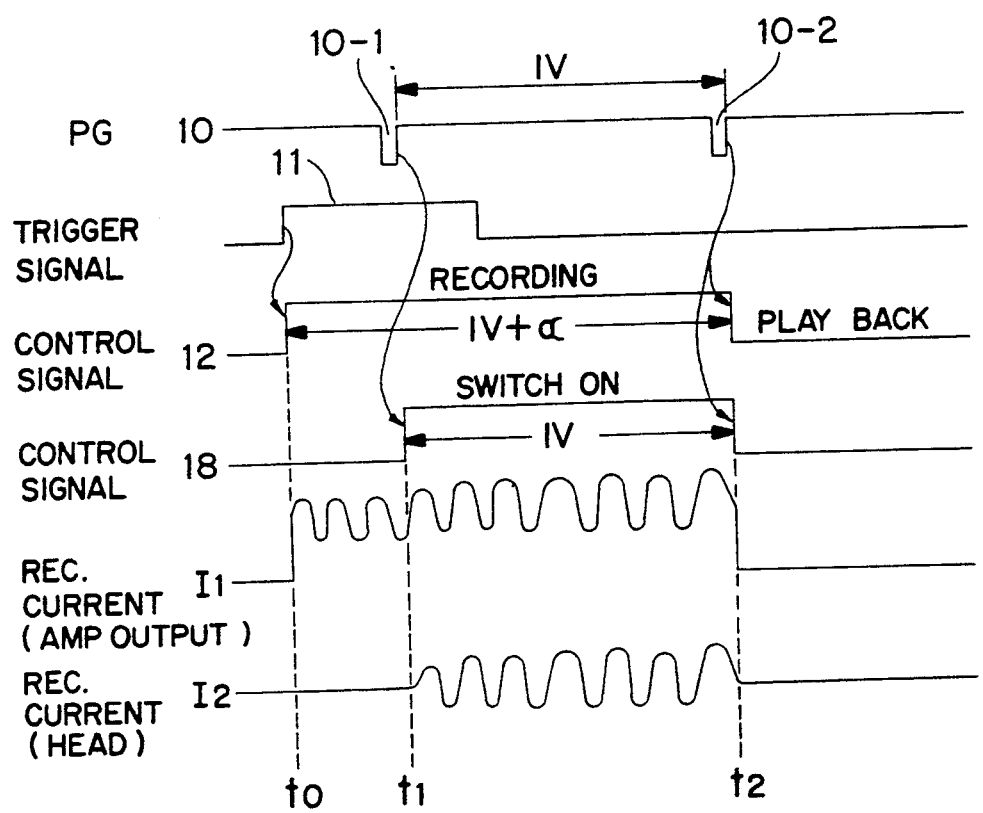
FIG. 2 is a timing chart.

Referring to FIG. 1 (circuit configuration) and FIG. 2 (operation), an embodiment on a field mode recording of an electronic still camera system is explained.

In FIG. 1, a terminal of a secondary coil of a step-up transformer 2 is connected to a terminal of a magnetic head 3. Another terminal of the secondary coil of the transformer 2 is connected to a ground through a switching circuit 16, where a trasistor is used. Another terminal of the magnetic head 3 is connected to the ground through a switching circuit 17 where a transistor is used. An output terminal of a recording amplifier 1 is connected to a primary coil of the transformer 2, and an input terminal of a play-back amplifier 5 is connected to the primary coil through a condenser 6.

The recording amplifier 1 and the play-back amplifier 5 are operated by a control signal 12 from a control circuit 7. Namely, the recording amplifier 1 supplies a recording current $I_1$ to the primary coil only during a term when the control signal 12 is at a high level. The play-back amplifier 5 operates only during a term when the control signal 12 is at a low level. Two switching circuits 16 and 17 turn on only during a term when a control signal 18 keeps its high level.

One period 1V of a PG signal 10 is a recording time for one track. As shown in FIG. 2, when a trigger signal 11 occurs, the control circuit 7 keeps the control signal 18 at a high level during 1V, i.e. from a time $t_1$ of a leading edge of a PG pulse 10-1 to a time $t_2$ of a leading edge of a next PG pulse 10-2. The control circuit 7 keeps the control signal 12 at a high level during $1V + \alpha$, i.e. a time $t_0$ of a leading edge of the trigger signal 11 to the time $t_2$.

When the recording current from the recording amplifier 1 turns off, two switching circuits 16, 17 turn off, then the connection between the secondary coil and the head 3 is opened. Therefore, a recording current $I_2$ can flow into the head 3, a transient current by a back electromotive force can not flow. When an output of the recording amplifier 1 is turned off after the time $t_2$, because two switching circuits 16, 17 have been turned off, the transient current does not flow into the head 3.

Since two switching circuits 16, 17 are kept at an ON condition during 1V or over, all information is recorded on one track without missing information. For example, switches 16 and 17 are kept on over IV by control signal 18 being changed at the high level from the time t. of the leading edge of the PG pulse 10-1 to the time after of the leading edge of the next PG pulse 10-2 by control circuit 7.

Figure 6:
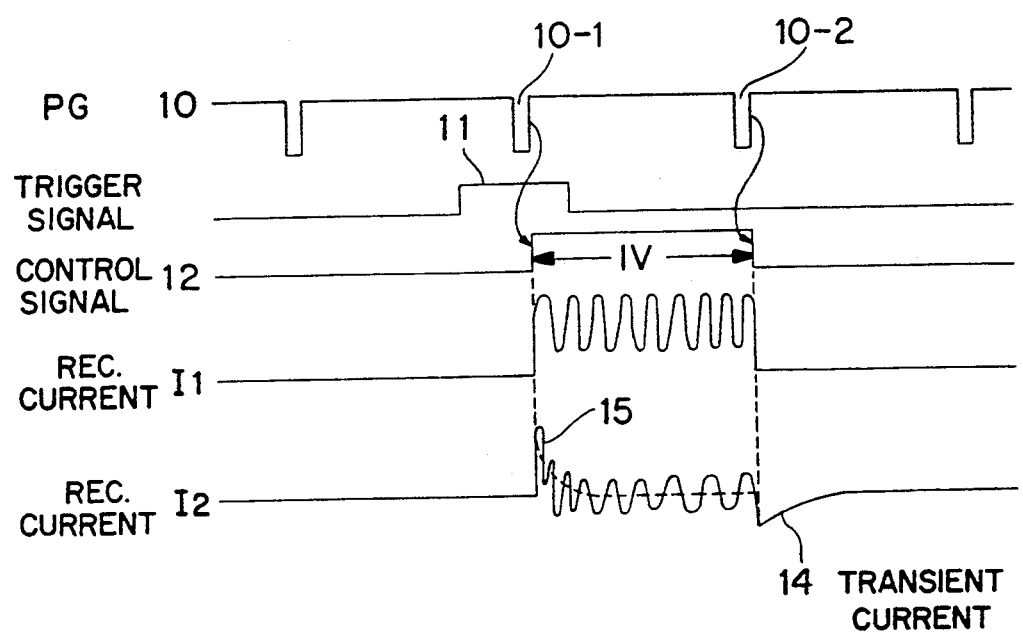
FIG. 6 is a timing chart.

In the prior art, as shown in FIG. 6, a top part 15 of the recording current $I_2$ has a level fluctuation by a transient phenomenon. The level fluctuation does not erase a recorded information. However, the level fluctuation reduces an S/N ratio.

As mentioned-above, in a case that the output of the recording amplifier 1 turns on at the time $t_0$ before the time $t_1$ when two switching circuits 16, 17 turn on, the recording current $I_2$ flows into the head 3 after a cession of the transient phenomenon. Therefore, a level of the current $I_2$ is constant.

Figure 3:
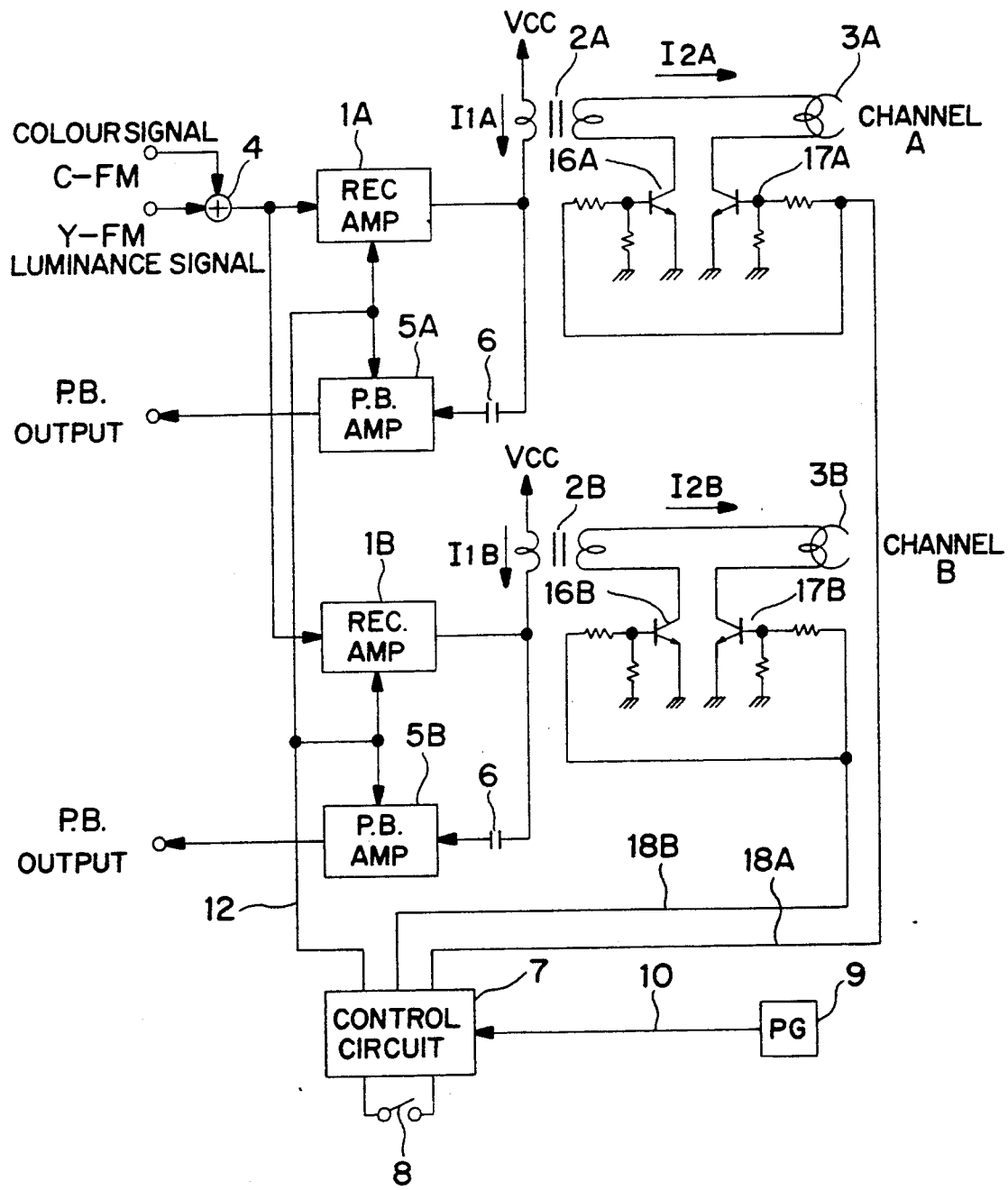
FIG. 3 shows a circuit configuration of another embodiment.
Figure 4:
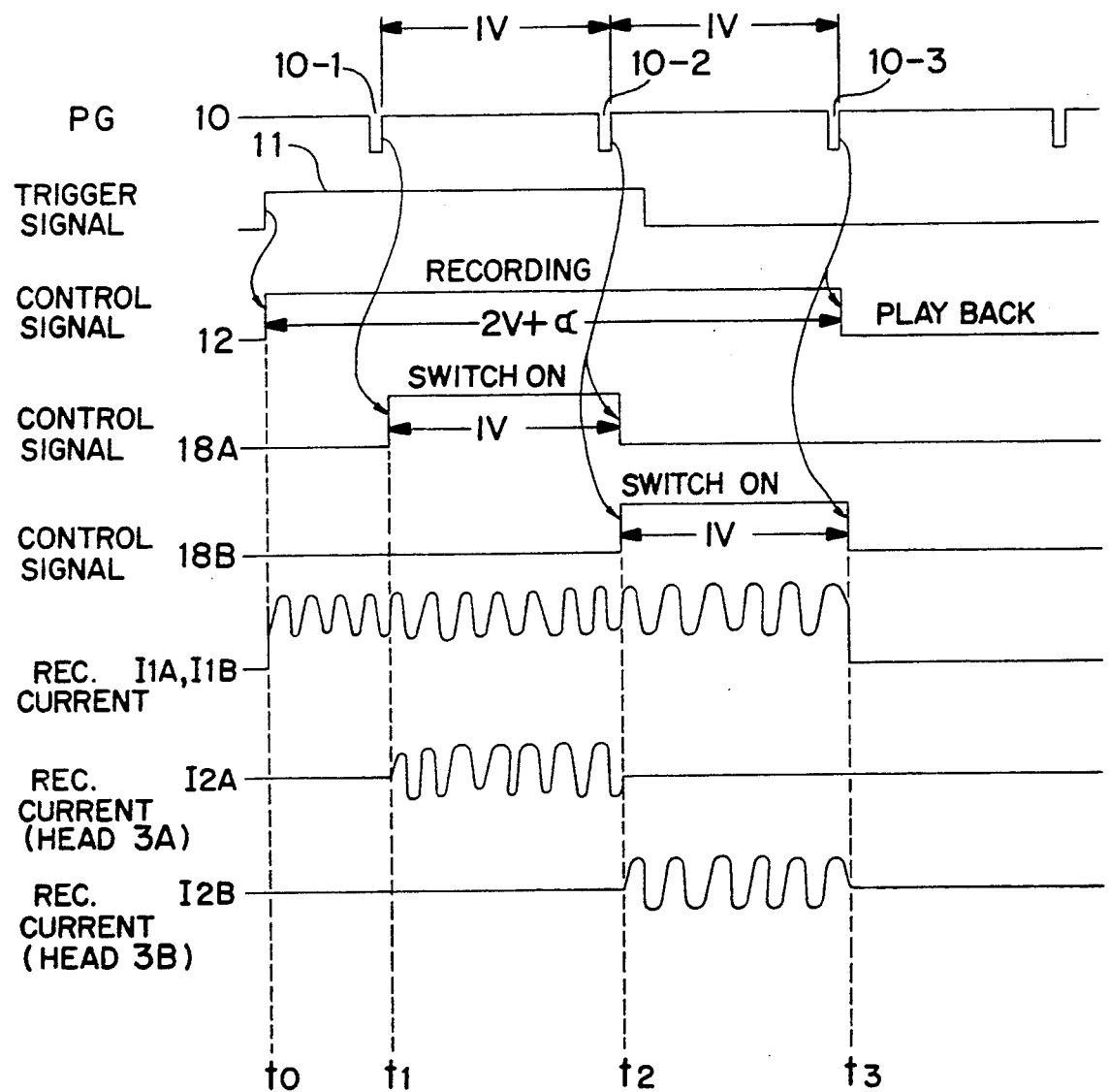
FIG. 4 is a timing chart.
Figure 5:
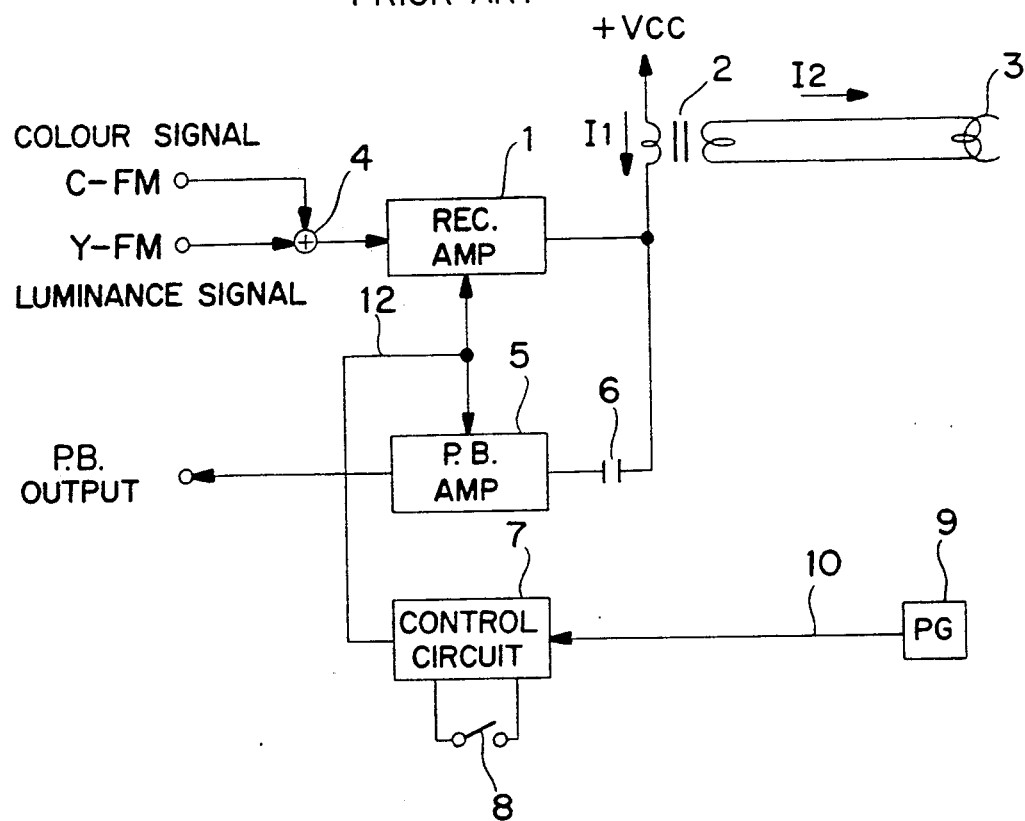
FIG. 5 shows a circuit configuration of a prior art.

Referring to FIG. 3 (circuit configuration) and FIG. 4 (operation), another embodiment is explained.

In FIG. 3, there are two recording channels A, B. A terminal of each magnetic heads 3A, 3B is connected to a terminal of each secondary coil of two transformer 2A, 2B. Another terminal of each secondary coil is connected to the ground through switching circuits 16A, 16B respectively and another terminal of each magnetic heads 3A, 3B is connected to the ground through switching circuits 17A, 17B.

Each output terminal of two recording amplifiers 1A, 1B is connected to each primary coil of two transformer 2A, 2B, and each input terminal of two play-back amplifiers 5A, 5B is connected to each primary coil through a condenser 6.

Two recording amplifiers 1A, 1B supply recording currents $I_{1A}$, $I_{1B}{}^1$ to the primary coils of two transformer 2A, 2B respectively only during a term when the control signal 12 is at a high level. $I_{1A} = I_{1B}$. Two play-back amplifiers 5A, 5B operate only during a term when the control signal 12 is at a low level.

In a channel A, two switching circuits 16A, 17A turns on only during a term when a control signal 18A keeps its high level. In a channel B, two switching circuits 16B, 17B turns on only during a term when another control signal 18B keeps its high level.

As shown in FIG. 4, when the trigger signal 11 occurs, the control circuit 7 keeps the control signal 18A at a high level during 1V, i.e. from the time $t_1$ of the leading edge of the PG pulse 10-1 to the time $t_2$ of the leading edge of the next PG pulse 10-2, and also the circuit 7 keeps the control signal 18B at a high level during 1V, i.e. from the time $t_2$ to a time $t_3$ of a leading edge of a next PG pulse 10-3. Moreover, the circuit 7 keeps the control signal 12 at a high level during $2V + \alpha$, i.e. from the time $t_0$ of the leading edge of the trigger signal 11 to the time $t_3$.

As a result, a first field signal of a frame signal is recorded on a track of a channel A by the head 3A and a second field signal is recorded on another track of a channel B by the head 3B.

In a case of recording, because the switching circuits 16A, 17A turn off when the recording amplifier 1A supplies the recording current $I_{1A}$, only a recording current $I_{2A}$ of the first field flows into the head 3A, then any transient current does not flow. On the other hand, because the switching circuits 16B, 17B turn off when the recording current $I_{1B}$ from the recording amplifier 1B stops, only a recording current $I_{2B}$ of the second field flows into the head 3B, then any transient current does not flow. Therefore, any information is not erased.

Moreover, because the outputs of two recording amplifiers 1A, 1B turn on at the time $t_0$ before the time $t_1$ or $t_2$, the level of each recording currents $I_{2A}$, $I_{2B}$ is constant.

The present invention can be applied to any type of an apparatus which records an information on a circular track of a magnetic diskh.

Since the transient current does not flow into the magnetic head when the output of the recording amplifier turns off, the magnetic recording apparatus of the present invention can record all information on the circular track without missing of the information.

What is claimed is:

1. A magnetic recording apparatus comprising a recording amplifier and a magnetic head coupled through a transformer to record data on a circular track of a magnetic disk; said recording amplifier being applied with a DC bias current and an information component for the same period as a recording instruction, said recording apparatus comprising;

switch means for turning on and off a closed loop circuit formed by said magnetic head and a secondary winding of said transformer coupled to said magnetic head, control means for controlling the recording amplifier and for turning the switch means on or off, wherein said recording amplifier outputs a recording current with a DC bias current into a primary coil of said transformer during a time period when said recording amplifier receives a recording instruction from said control means, said control means outputs switching control instructions for turning said switch means on during a predetermined time period for a recording time of one track or until a predetermined time elapsed thereafter, and said control means outputs said recording instruction for supplying recording current from said recording amplifier to a primary coil of said transformer simultaneously with or before turning on said switch means and for turning off said recording current simultaneously with or after turning off said switch means.

2. An apparatus claimed in claim 1, said apparatus having two recording amplifiers, two magnetic heads, two transformers and two switch means.

* * * * *